United States Patent [19]

Link

[11] 4,150,795
[45] Apr. 24, 1979

[54] WASTE FOOD PROCESSOR

[75] Inventor: Donald F. Link, Huntsville, Ala.

[73] Assignee: Recovery Systems, Inc., Charleston, S.C.

[21] Appl. No.: 821,353

[22] Filed: Aug. 3, 1977

[51] Int. Cl.² ............................................. B02C 11/08
[52] U.S. Cl. ...................................... 241/33; 241/65; 241/101.3; 241/222; 241/227
[58] Field of Search ................... 241/46 R, 46 B, 65, 241/66, 101.2, 101.3, 101.4, 101.5, 167, 221, 222, 224, 225, 227

[56] References Cited

U.S. PATENT DOCUMENTS

| 1,262,247 | 4/1918 | Peiler | 241/66 |
| 1,421,283 | 6/1922 | Meakin | 241/101.2 |
| 2,446,952 | 8/1948 | Randolph | 241/65 |
| 3,372,878 | 3/1968 | Verdier | 241/225 |

Primary Examiner—Robert L. Spicer, Jr.
Attorney, Agent, or Firm—C. A. Phillips

[57] ABSTRACT

A system for the manufacture of animal feed from food waste wherein the food waste is ground, sterilized, and then dried in a drum dryer wherein an even and continuous drying process is effected by feed control and by zone regulating the temperature of the surface of the drums of the dryer.

3 Claims, 4 Drawing Figures

WASTE FOOD PROCESSOR

BACKGROUND OF THE INVENTION

1. Field of the Invention

This invention relates to the conversion of food waste into animal feed, and more particularly to an improved means for the manufacture of animal feed.

2. General Description of the Prior Art

For a number of years efforts have been underway to perfect a machine which would be compact and reasonably priced for the conversion of waste food into something useful, notably animal feed. As far as the applicant can determine, there is yet to be provided such a machine, and it is an object of this invention to so provide one.

SUMMARY OF THE INVENTION

In accordance with the invention, fine ground waste food, such as provided by the emulsifier described in the applicant's co-pending application, entitled "Food Processing System", Ser. No. 766,132, filed Feb. 7, 1977, now U.S. Pat. No. 4,074,868, issued Feb. 21, 1978, is fed through a buffer storage unit on demand to a reservoir formed between the upper and facing rotating sides of a controlled heat double drum dryer. The material, having an initial liquid content of 75% to 85%, is heated by contact with the heated surfaces of the drums and is fed through a narrow passageway, e.g., 0.016 inch (0.006 to 0.030 inch), between the drum surfaces to which it adheres, forming a layer on each of approximately 0.008 inch in thickness. When the drum has rotated the material about 230°, the material is dried to the extent of having 10% to 14% of moisture; and at this point, blades cut the material from the drums. The material is the chopped or cut into a meal for use as an animal feed. Additionally, and in accordance with a further aspect of this invention, a plurality of heating elements is axially arranged inside each rotating drum, together with coordinately positioned heat sensors which sense heat in discrete zones of a drum. The sensors then separately control the heating elements to effect a uniform heat condition over the surface of a drum.

DETAILED DESCRIPTION OF THE DRAWINGS

Figure 1:
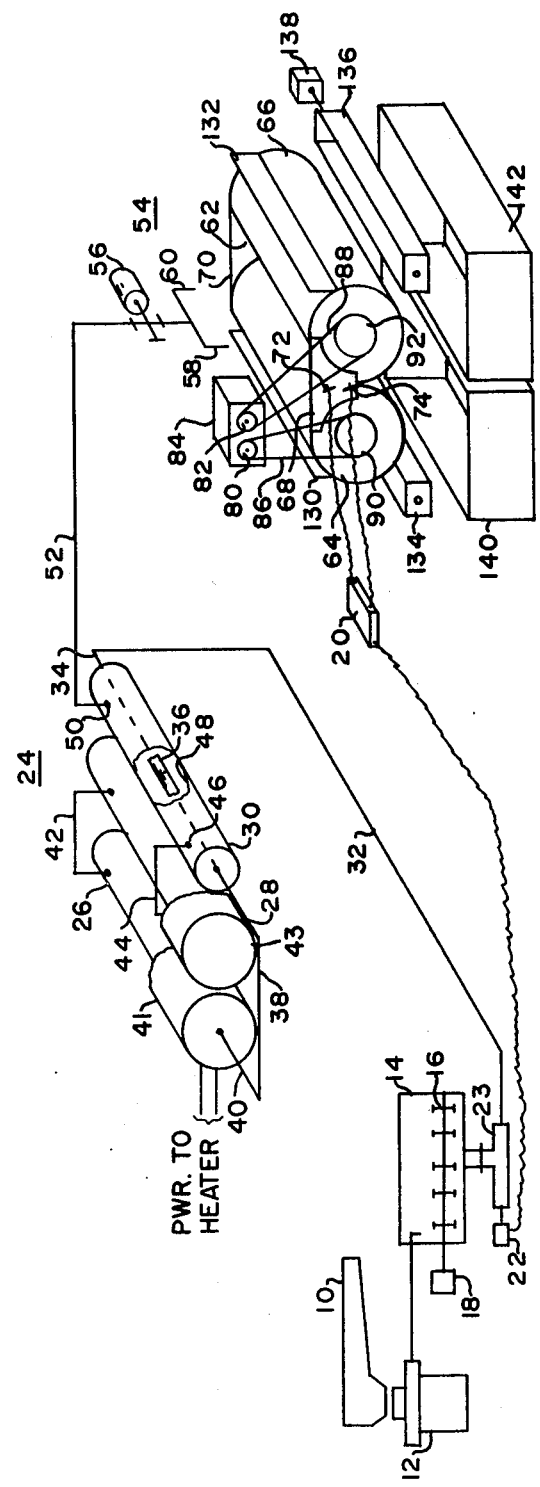
FIG. 1 is a partially pictorial-partially diagrammatic illustration of an embodiment of the invention.

Referring to FIG. 1, waste food to be processed (typically from a restaurant) is first placed on receiver and tray 10 where an operator would remove any metal objects (with or without the assistance of an automatic metal detector) and permit or urge the waste food to be moved into grinder-emulsifier 12. Grinder-emulsifier 12 reduces the waste food to an emulsion (typically having a moisture content of 75% to 85%) wherein the largest particle size is approximately under 0.030 inch (0.005 to 0.030 inch) in maximum linear dimension. The emulsion is then supplied by virtue of a pumping action provided by grinder-emulsifier 12 to buffer storage unit 14. This unit constantly stirs and maintains a homogenous state of the waste food material, utilizing stirring arms 16 powered by motor 18. Upon demand, and as determined by control 20, motor 22 would be energized, causing pump 23 to supply emulsified food waste from buffer storage unit 14 to sterilizer 24 under selected pressure to effect a selected rate of flow through sterilizer 24.

Figure 1A:
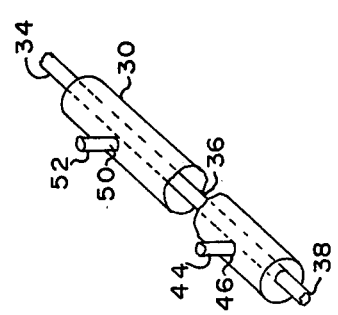
FIG. 1a is a pictorial view, partially broken away, showing a detail of construction of a heat exchanger.

Sterilizer 24 consists of serially arranged tubular members 26, 28, and 30, tubular member 26 performing a heating function, tubular member 28 (as described below) performing a temperature maintenance function, and tubular member 30, (as described below) performing a cooling-preheat function (FIG. 1a). The waste food from buffer storage unit 14 is first fed through pipe 32 to an inlet end 34 of heat exchange tube 36 which extends along the center of tubular member 30. This waste food is generally at ambient temperature (typically room temperature), and as it passes through tube 30, it receives heat from and thereby cools waste food previously heated by tubular member 26 and received in tubular member 30 from tubular member 28 as further explained below. From heat exchange tube 36 the material is fed to inlet 40 of tube 26 by pipe 38. Tube 26 includes heating means, e.g., heater 41, which raises the temperature of the food waste to a temperature of between 120° F. and 350° F., for example, 300° F. The thus heated material from tubular member 26 is then transferred by pipe 42, under pressure, to tubular member 28 and is moved through tubular member 28 at a controlled rate as determined by pump 23. Tubular member 28 is insulated by insulation 43 and to maintain the material at certain temperature during the transit time of the material through tube 28. For example, by the controlled rate of flow the material would be maintained at a temperature of approximately 300° F. for a minimum of 10 seconds. In this manner, it can be assured that there will be a thermal kill of bacteria or other viruses.

Pipe 44 receives the waste food that has transited tube 28 and supplies it to inlet 46 of tube 30 where it is passed through chamber 48 of tubular member 30, around heat exchange pipe 36, exiting at exit 50 where it is supplied to pipe 52. In transiting tubular member 30, the waste food is in engagement with heat exchange pipe 36 which, as stated above, has in it the relatively cool waste food from pump 23, and in this manner the heated waste food in tubular member 30 is somewhat cooled and thus produces a reduction in pressure at outlet 50 coordinate with the setting of pressure regulator 56. By the same token, the waste food from pump 23 in pipe 36 is preheated.

Pipe 52 then transfers the waste food from tube 30 to dehydrator 54, pipe 52 having in it back pressure regulator 56 to enable pressures, 25 to 50 PSI, to be maintained, and which enables the bacteria-killing temperatures to be effected without boiling in tubular members 26 and 28 and the connecting pipes. Waste food is discharged through two or more distribution pipes 58 and 60 into a valley region or reservoir 62 between drums 64 and 66 of dehydrator 54. This reservoir for the emulsified food is formed by the combination of drums 64 and 66 and end plates 68 and 70 which form a seal of the ends of the drums, the latter fitting within sealing grooves 69 and 69a of the drums shown in FIG. 2.

In order to maintain an approximate level of emulsified food in reservoir 62, and to prevent overflow, high level sensor 72 and low level sensor 74 are employed and operate an on-off control or control switch 20 which applies power to motor 22 of pump 23. Thus, when the level is reservoir 62 drops to the level of sensor 74, control 20 is operated to operate motor 22 "on", and then when the level rises up to level sensor 72, control 20 is operated to operate motor 22 "off". Thus, there is maintained a level in reservoir 62 which is in the range of elevations between sensors 72 and 74.

The two drums of dehydrator 54, drums 64 and 66, are positioned parallel with adjustable settings (by means not shown) to maintain the nearest contact between drums (at a tangent or nip line) at a selected spacing and typically between 0.006 and 0.030 inch. In this manner, the thickness of material applied to the drums is controlled, as will be further explained. The drums are counter-rotated by means of counter-rotating drive gears 80 and 82 driven by motor 84 and connecting through chains 86 and 88 to gears 90 and 92, respectively, driving drums 64 and 66.

Figure 2A:
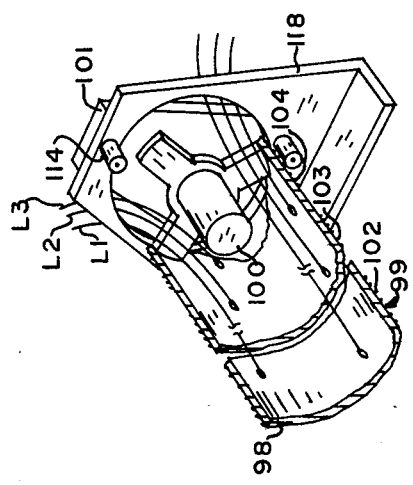
FIG. 2a is a pictorial view of a portion of the dryer drum assembly shown in FIG. 2.
Figure 2:
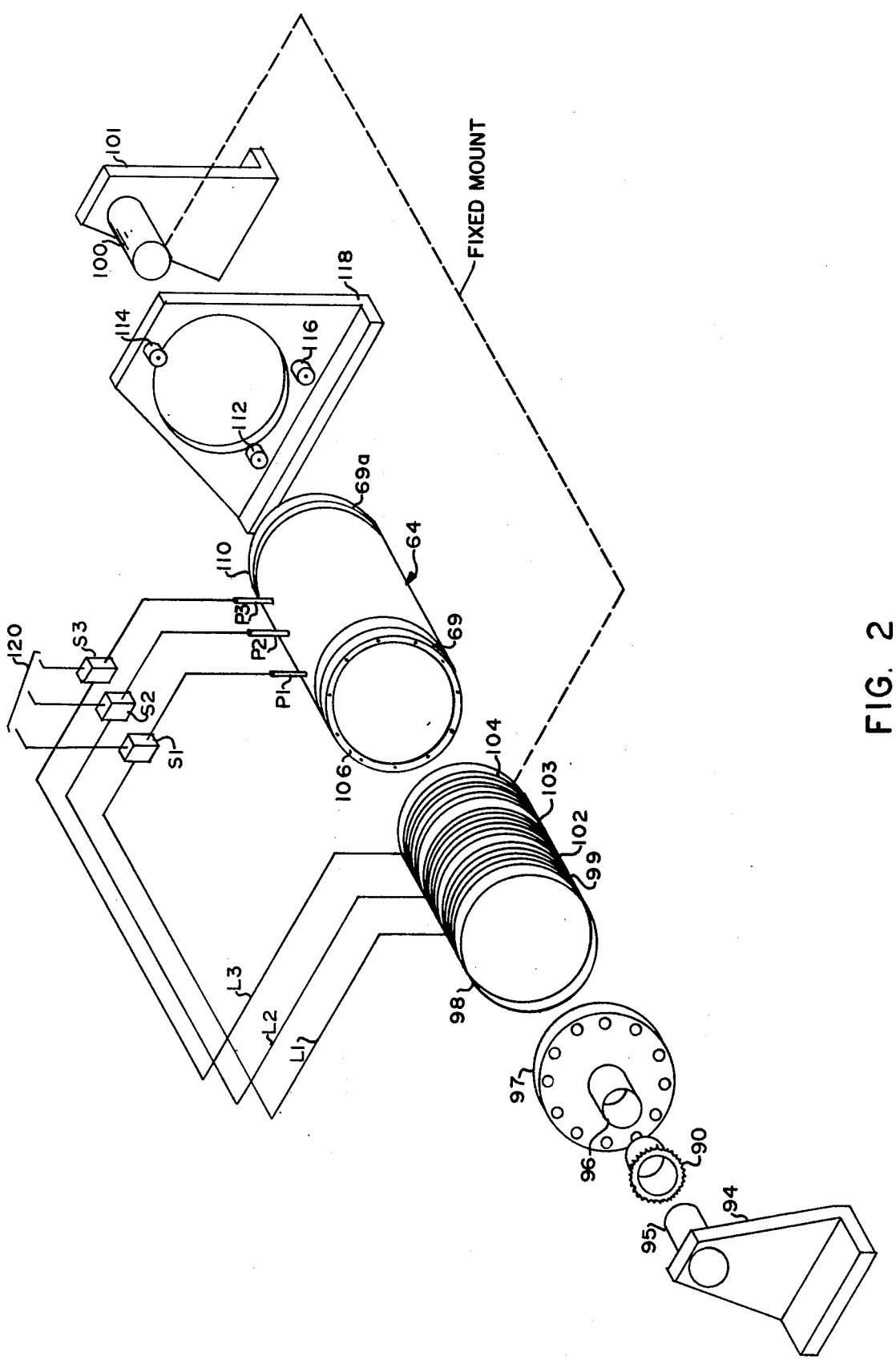
FIG. 2 is an exploded view, partially diagramatic, of the construction of one of the dryer drum assemblies as contemplated by the invention.

Referring additionally to FIGS. 2 and 2a, showing a portion of the drive and heating assembly for one of the drums, drum 64, it will be noted that the left side of a drum is supported on support bracket 94 by axle 95, rotatably supporting bearing 96 on drum end plate 97. Tubular member 98 of drum heater 99 is fixed mounted on axle 100, in turn supported by bracket 101. It includes three separate heating elements, 102, 103, and 104, spaced axially along the outer surface of tube 98.

As schematically illustrated, each of the three heating elements is supplied power through a separate set of power leads $L_1$, $L_2$, and $L_3$, in turn connected, respectively, to control or relay switches $S_1$, $S_2$, and $S_3$. Drum 64 fits over drum heater 99, and one end of drum 64, end 106, attaches to end plate 97 for rotation on shaft 95. Drive gear 90 is attached, by means not shown, to end plate 97. The opposite end, end 110, of drum 64 is supported for rotation by spaced rollers 112, 114, and 116 on support bracket 118. Separate heat probes or sensors $P_1$, $P_2$, and $P_3$ are positioned to have a frictional engagement with drum 64 as it rotates and to sense the temperature of discrete zones of drum 64, zones corresponding to the heating zones provided by heating elements 100, 103, and 104. In this fashion, heat sensors $P_1$, $P_2$, and $P_3$, which may be simply thermal sensitive switches, open at a selected elevated temperature of from 300° F. to 400° F. and control switching relays $S_1$, $S_2$, and $S_3$ to thereby control power supplied to heating elements 100, 103, and 104 from power source leads 120.

In operation, the waste food enters the valley or reservoir between the drums where it immediately begins a cooking action that drives off some moisture, leaving a more dense material that settles to the nip line at the bottom of reservoir 62 between the rotating surfaces of drums 64 and 66. The dense material is then extruded through this nip line of near contact between the counter-rotating drums, causing the material to adhere to the heated surface of the drums. As the drums continue to rotate, the food material is parted, leaving a thin coat on each of the drums. The heated drums continue to drive off the remaining moisture as the drum rotates and passes through an arc of approximately 230° (185° to 230°) at a speed which enables sufficient drying. Desirably at this point, the material will have been sufficiently dried to have approximately 10% to 14% moisture. The thus dried material is then sheared from the drum by knives 130 and 132 (FIG. 1. Desirably the pressure of a knife would be between a two-pounds-per-linear inch and 30-pounds-per-linear inch, and a knife edge would be positioned at an angle of between 27° and 30° with respect to the surface of the drum at the point of engagement.

After shearing, the food material leaves a drum in the form of sheets of dried material. Where it is desired to further process the dried material, the material may be dropped into one of like milling machines 134 and 136 (each being powered by a motor 138) where the material is reduced to a dry meal. These milling machines would be conventional, employing rotating sets of blades passing between slots. From the milling machine the material would drop into receiver bins 140 and 142 for accumulation and temporary storage pending being shipped in bulk or placed in containers for shipment. Alternately, the dry meal would be formed into pellets before shipment.

As an alternate arrangement, to be used when the waste food does not require sterilization, sterilizer 24 would be omitted and the output of pump 23 connected to outlets 58 and 60 of dehydrator 54.

What is claimed is:

1. A waste food processor comprising:
   pulverizing means for reducing the particle size of waste food to a particle size of 0.005 to 0.030 inch in thickness;
   buffer storage means for receiving the output of said pulverizing means and making it available as an output, on demand;
   drying means for receiving the output of said buffer storage means and comprising:
   a pair of rotating drums positioned parallel, side by side, with counter-rotating surfaces spaced apart 0.006 to 0.030 inch at a nip line between drums,
   a reservoir formed between upper adjacent portions of said drums, and including dams engaging between drums at ends of the drums,
   elevation sensing means for sensing the level of material dammed between said drums, and including means responsive to said sensing means for selectively pumping material from said buffer storage means to said reservoir for maintaining the level of material in said reservoir between selected limits, and
   means for evenly maintaining heat in said drums at a temperature in the range of 300° F. to 400° F., whereby material passing through said nip line coasts said drums; and
   blade means in engagement with each said drum along a line spaced 180° to 230° of angular rotation from said nip line for removing dried material from said drum.

2. A waste food processor as set forth in claim 1 wherein said means for evenly maintaining heat comprises:
   a stationary tubular member located within and axially aligned with each said drum and having a plurality of heating elements, each extending around said tubular member, and the heating elements being axially spaced along said tubular member;
   a like plurality of heat sensing means, each being in engagement with axially spaced locations on the surface of said rotating drum to one of said heating elements for providing output signals responsive to the heat sensed at specific points on the surface of a said drum; and
   a like plurality of electrical control means, each being responsive to one of said heat sensing means for providing power to an oppositely positioned said heating element for regulating the temperature of discrete zones of said drum, whereby an even heating of each said drum is substantially effected.

3. A waste food processor as set forth in claim 2 further comprising sterilization means connected in series between said buffer storage means and said drying means and comprising:

first, second, and third tubular members connected end-to-end and being serially in numerical order;

said first tubular member includes means for heating the contents of that tubular member;

said second tubular member being an insulated tube; and said third tubular member includes a heat exchange tube extending the length of said third tubular member;

one end of said heat exchange tube being connected to said buffer storage means, and an opposite end of said heat exchange tube being connected to one end, an inlet, of said first tube; and one end, an outlet, of said third tube being coupled to said reservoir of said drying means;

whereby food waste from said buffer storage means is preheated in passing through said heat exchange tube to said first tubular member, the waste food heated in said first tubular member is held at elevated temperatures in passing through said second tubular member, and then when passing through said third tubular member, it is partially cooled by engagement with said heat exchange tube and thereafter supplied to said dehydrating means.

* * * * *